(12) United States Patent
Inoue et al.

(10) Patent No.: US 6,359,870 B1
(45) Date of Patent: Mar. 19, 2002

(54) RECEIVING APPARATUS WITH INTERMITTENT RECEIVING

(75) Inventors: Masayuki Inoue; Yukio Sato, both of Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/106,747

(22) Filed: Jun. 30, 1998

(30) Foreign Application Priority Data

Jul. 7, 1997 (JP) ............................................. 9-180865

(51) Int. Cl.[7] .................................................. H04J 3/06
(52) U.S. Cl. ...................................... 370/337; 370/350
(58) Field of Search ................................ 370/350, 503, 370/347, 337; 455/130

(56) References Cited

U.S. PATENT DOCUMENTS 5,177,140 A * 1/1993 Toy et al. ................... 370/100
5,809,009 A * 9/1998 Matsuoka ................... 370/206

FOREIGN PATENT DOCUMENTS

| JP | 6-350405 | 12/1994 |
| JP | 7-183924 | 7/1995 |

* cited by examiner

Primary Examiner—Chau Nguyen
Assistant Examiner—Ron Abelson
(74) Attorney, Agent, or Firm—Lowe Hauptman Gilman & Berner, LLP

(57) ABSTRACT

A receiving apparatus with intermittent receiving for receiving a TDMA SIG is disclosed. The receiving apparatus receives a FRQ reference SIG to control a voltage controlled OSC for generating a system clock and receives a TDMA synchronizing SIG to control the phase of a TDMA timing SIG to establish the reference FRQ synchronizing and the TDMA synchronizing. To save a power consumption in the sleep interval during the intermittent receiving, it is stopped to supply a supply power to a d/a converter supplied with the FRQ control data to supply a FRQ control voltage to the voltage controlled OSC. Just before an intermittent receiving interval, that is, the end of the sleep mode, the supply power to the d/a converter is supplied and the TDMA timing is compensated by calculation from the sleeping interval and the FRQ of the self-oscillation of the voltage controlled OSC. The TDMA timing may be not compensated but receives the TDMA synchronizing SIG to control the TDMA synchronizing if the phase difference in the TDMA timing is within the range of the correlator. The FRQ reference SIG may be received to compensate the FRQ and phase of the system clock and the TDMA synchronizing timing may be compensated by calculation from the sleeping interval and the FRQ of the self-oscillation of the voltage controlled OSC.

4 Claims, 4 Drawing Sheets

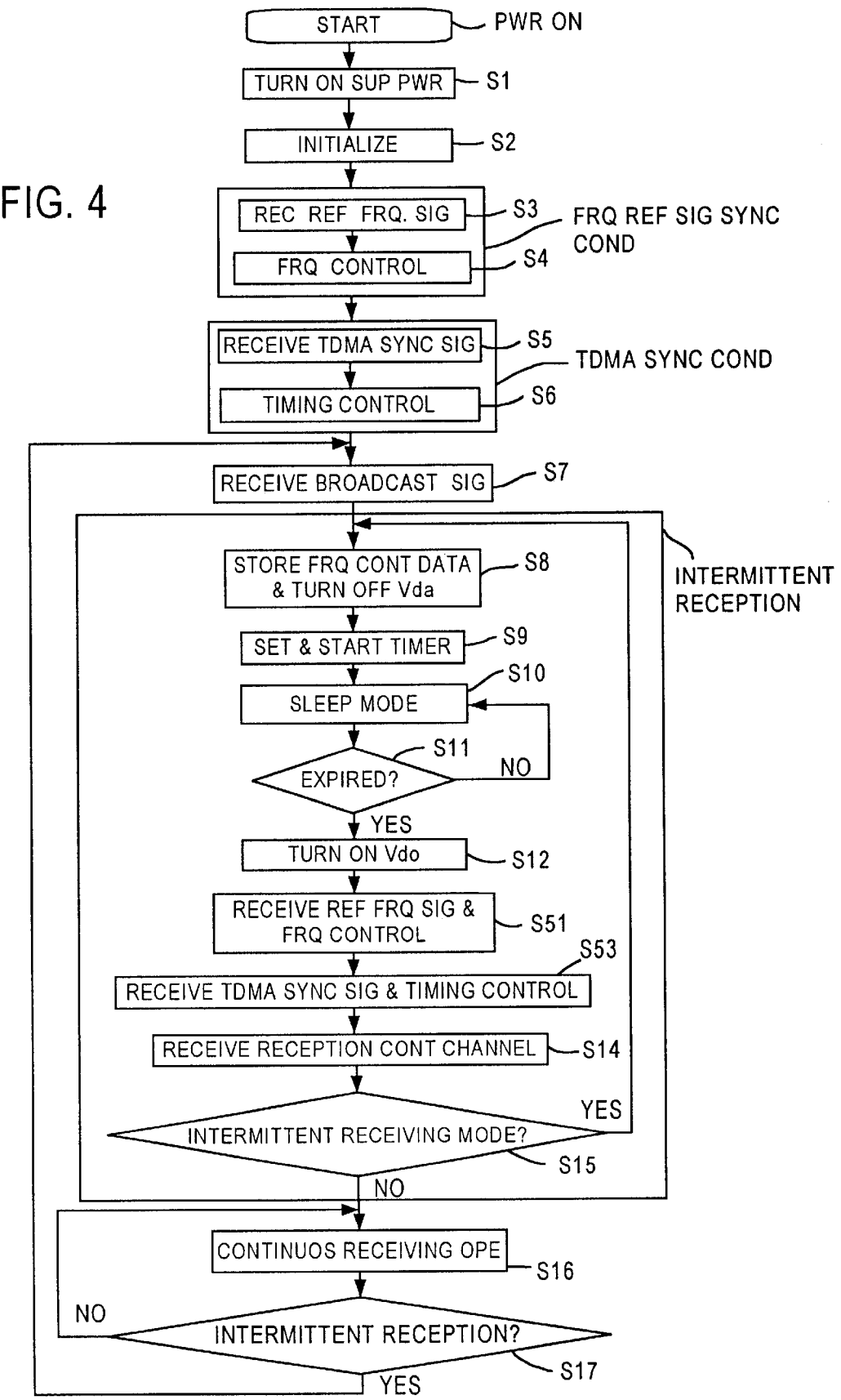

RECEIVING APPARATUS WITH INTERMITTENT RECEIVING

BACKGROUND OF THE INVENTION

1. Field of the Invention

This invention relates to a TDMA communication apparatus with intermittent receiving, particularly to a receiving apparatus with intermittent receiving.

2. Description of the Prior Art

A receiving apparatus for receiving a TDMA (Time Division Multiple Access) communication signal and for receiving a reception control channel to perform intermittent receiving operation to save a power consumption during the standby condition is known. In such a prior art receiving apparatus, it is necessary to keep TDMA synchronizing to receive the reception control channel, so that there was a limitation in saving power in the clock circuit.

SUMMARY OF THE INVENTION

The aim of the present invention is to provide a superior receiving apparatus with intermittent receiving.

According to the present invention there is provided a first receiving apparatus with intermittent receiving includes a receiving circuit responsive to a system clock signal for receiving a TDMA radio wave signal including frequency reference signal, a TDMA synchronizing signal, a broadcast signal, a reception control signal, and a communication signal; an equalizing circuit responsive to the system clock signal for equalizing the TDMA radio wave signal and outputting an equalized signal; a frequency detection circuit responsive to the equalized signal for detecting a frequency and a phase of the frequency reference signal in the equalized signal; a correlation detection circuit responsive to the equalized signal for detecting a correlation between the TDMA synchronizing signal in the equalized signal and a predetermined data pattern representing TDMA timing; a clock generation circuit including supply power control circuit, a d/a converter supplied with a supply power through the power supply control circuit and a voltage controlled oscillator for generating the system clock signal of which frequency and phase are controlled in accordance with frequency control data when the d/a converter supplied with the supply power and generating the system clock signal at a predetermined self-oscillation frequency when the d/a converter is not supplied with the supply power; a TDMA timing signal generation circuit for generating a TDMA timing signal in accordance with timing control data; a timer circuit for generating a timing signal; a microprocessor supplied with the system clock signal, including a memory for storing the frequency control data and data of the predetermined frequency, in a continuous receiving receiving mode, the microprocessor generating the frequency control data to control the frequency and phase of the system clock signal in accordance with the detected frequency and phase to establish a system clock synchronizing condition with the frequency reference signal, generating the timing control data in accordance with the detected correlation to establish a TDMA synchronizing condition with the TDMA synchronizing signal, in an intermittent reception mode, the microprocessor detecting data of an intermittent operation interval in the broadcast signal, storing the frequency control data, stopping supplying the supply power to the d/a converter using the supply power control circuit, setting and starting the timer circuit to generate the timing signal at a timing a predetermined period before the intermittent operation interval expires, and in response to the timing signal, the microprocessor supplying the supply power to the d/a converter using the power supply control circuit, reading the frequency data from the memory, supplying the read frequency control data to the d/a converter, calculating the timing control data from the intermittent operation interval data and data of the predetermined self-oscillation frequency to compensate the timing control data to establish the TDMA synchronizing condition again just before the intermittent operation interval expires to receive the reception control signal and the communication signal.

In the first receiving apparatus, the microprocessor controls the equalizing circuit to receive the communication signal in accordance with data in the reception control signal.

According to the present invention there is also provided a second receiving apparatus includes: a receiving circuit responsive to a system clock signal for receiving a TDMA radio wave signal including frequency reference signal, a TDMA synchronizing signal, and a broadcast signal, reception control signal, and a communication signal; an equalizing circuit responsive to the system clock signal for equalizing the TDMA radio wave signal and outputting an equalized signal; a frequency detection circuit responsive to the equalized signal for detecting a frequency and a phase of the frequency reference signal in the equalized signal; a correlation detection circuit responsive to the equalized signal for detecting a correlation between the TDMA synchronizing signal in the equalized signal and a predetermined data pattern representing TDMA timing; a clock generation circuit including supply power control circuit, a d/a converter supplied with a supply power through the power supply control circuit and a voltage controlled oscillator for generating the system clock of which frequency and phase are controlled in accordance with frequency control data when the d/a converter supplied with the supply power and generating the system clock at a predetermined self-oscillation frequency when the d/a converter is not supplied with the supply power; a TDMA timing signal generation circuit for generating a TDMA timing signal in accordance with timing control data; a timer circuit for generating a timing signal at a timing in accordance with timer control signal; a microprocessor supplied with the system clock, including a memory for storing the frequency control data and data of the predetermined frequency, in a continuous reception mode, the microprocessor generating the frequency control data to control the frequency and phase of the system clock in accordance with the detected frequency and phase to establish a system clock synchronizing condition with the frequency reference signal, generating the timing control data in accordance with the detected correlation to establish a TDMA synchronizing condition with the TDMA synchronizing signal, in an intermittent reception mode, the microprocessor detecting data of an intermittent operation interval in the broadcast signal, storing the frequency control data, stopping supplying the supply power to the d/a converter using the supply power control circuit, setting and starting the timer circuit to generate the timing signal at a timing a predetermined period before the detected intermittent operation interval expires, and in response to the timing signal, supplying the supply power to the d/a converter and reading the frequency data from the memory and supplying the read frequency control data to the d/a converter, detecting the correlation using the correlation detection circuit to compensate the timing control data to establish the TDMA synchronizing condition again Just before the intermittent operation interval expires to receive the reception control signal and the communication signal.

According to the present invention there is further provided a third receiving apparatus including: a receiving circuit responsive to a system clock signal for receiving a TDMA radio wave signal including frequency reference signal, a TDMA synchronizing signal, and a broadcast signal, reception control signal, and a communication signal; an equalizing circuit responsive to the system clock signal for equalizing the TDMA radio wave signal and outputting an equalized signal; a frequency detection circuit responsive to the equalized signal for detecting a frequency and a phase of the frequency reference signal in the equalized signal; a correlation detection circuit responsive to the equalized signal for detecting a correlation between the TDMA synchronizing signal in the equalized signal and a predetermined data pattern representing TDMA timing; a clock generation circuit including supply power control circuit, a d/a converter supplied with a supply power through the power supply control circuit and a voltage controlled oscillator for generating the system clock of which frequency and phase are controlled in accordance with frequency control data when the d/a converter supplied with the supply power and generating the system clock at a predetermined self-oscillation frequency when the d/a converter is not supplied with the supply power; a TDMA timing signal generation circuit for generating a TDMA timing signal in accordance with timing control data; a timer circuit for generating a timing signal at a timing in accordance with timer control signal; a microprocessor supplied with the system clock, including a memory for storing the frequency control data and data of the predetermined frequency, in a continuous reception mode, the microprocessor generating the frequency control data to control the frequency and phase of the system clock in accordance with the first detected frequency and phase to establish a system clock synchronizing condition with the frequency reference signal, generating the timing control data in accordance with the detected correlation to establish a TDMA synchronizing condition with the TDMA synchronizing signal, in an intermittent reception mode, the microprocessor detecting data of an intermittent operation interval in the broadcast signal, storing the frequency control data, stopping supplying the supply power to the d/a converter using the supply power control circuit, setting and starting the timer circuit to generate the timing signal at a timing a predetermined period before the intermittent operation interval expires, and in response to the timing signal, the microprocessor supplying the supply power to the d/a converter, reading the frequency data from the memory, supplying the read frequency control data to the d/a converter, operating the frequency detection circuit to detect a second detected frequency of the frequency reference signal, generating the frequency control data in accordance with the second detected frequency, calculating the timing control data from the data of intermittent operation interval and data of the predetermined self-oscillation frequency to compensate the timing control data to establish the TDMA synchronizing condition again Just before the detected intermittent operation interval expires to receive the reception control signal and the communication signal.

BRIEF DESCRIPTION OF THE DRAWINGS

The object and features of the present invention will become more readily apparent from the following detailed description taken in conjunction with the accompanying drawings in which:

FIG. 4 depicts a flow chart of a receiving apparatus of a third embodiment showing its operation.

The same or corresponding elements or parts are designated with like references throughout the drawings.

DETAILED DESCRIPTION OF THE INVENTION

Hereinbelow will be described a first embodiment of this invention.

Figure 1:
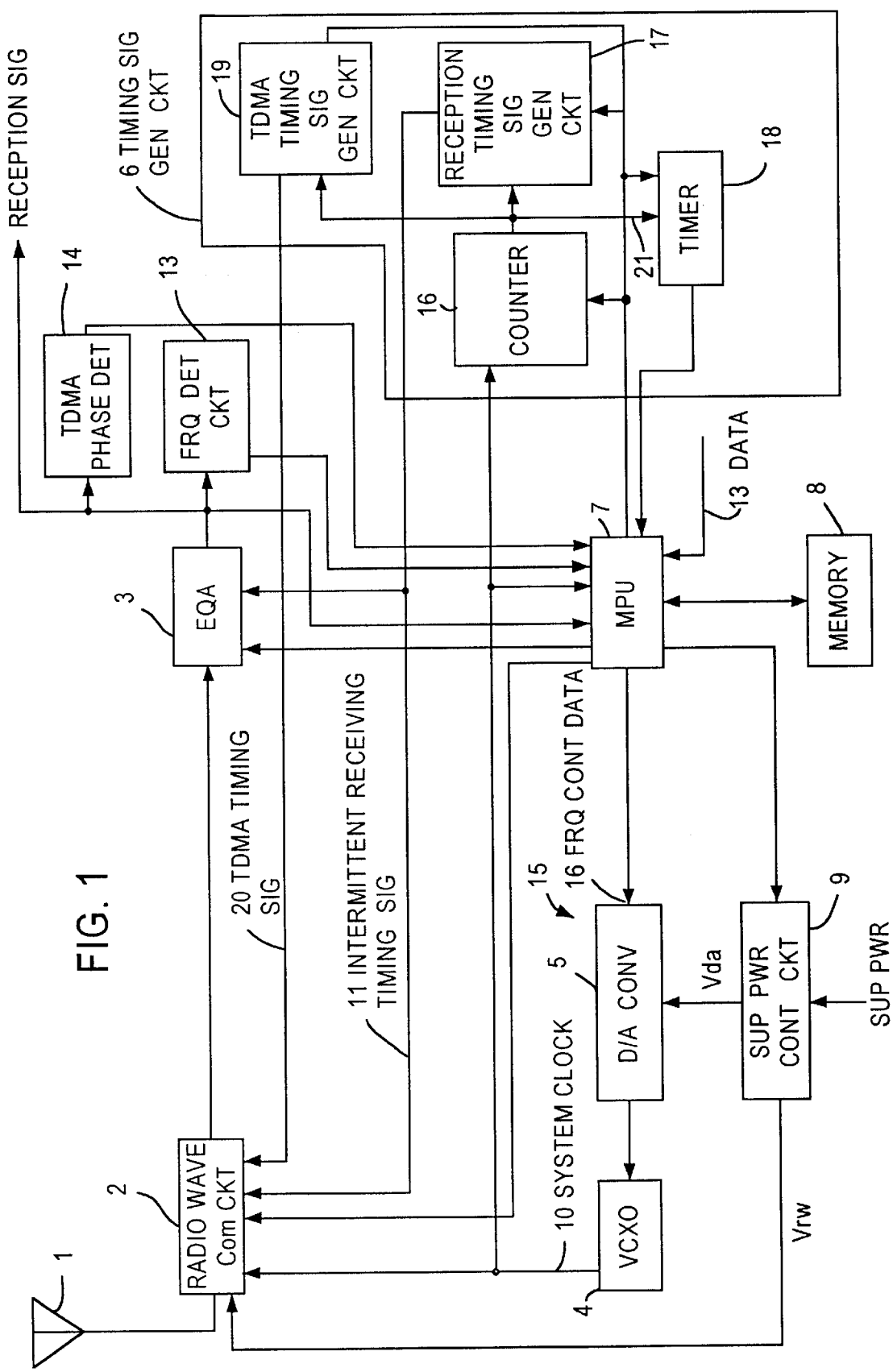
FIG. 1 is a block diagram of a receiving apparatus with intermittent receiving of a first embodiment.

FIG. 1 is a block diagram of a receiving apparatus with intermittent receiving of the first embodiment.

The receiving apparatus of the first embodiment includes, a radio wave receiving circuit 2 for receiving a TDMA radio wave signal including frequency reference signal, a TDMA synchronizing signal, and a broadcast signal, a reception control signal, and a communication signal in response to a reception timing signal, an equalizing circuit 3 for equalizing the TDMA radio wave signal from the radio wave communication circuit 2 and outputting the equalized TDMA radio wave signal as a reception signal (equalized signal), a frequency detection circuit 13 responsive to the equalizing circuit 3 for detecting a frequency and a phase of the frequency reference signal in the reception signal, a correlation detection circuit 14 responsive to the equalizing circuit 3 for detecting a correlation between the TDMA synchronizing signal in the reception signal and a predetermined data pattern representing TDMA timing, a supply power control circuit 9 for controlling supplying powers to the radio wave communication circuit 2 and a d/a converter 5, a system clock generation circuit 15 including the d/a converter 5 supplied with a supply power through the power supply control circuit 9 and a voltage controlled crystal oscillator 4 for generating the system clock of which frequency and phase are controlled in accordance with frequency control data 16 when the d/a converter supplied with the supply power and generating the system clock at a predetermined self-oscillation frequency when the d/a converter is not supplied with the supply power, a timing signal generation circuit 6 including a counter 16 for counting the system clock and outputting time count data 21, a TDMA timing signal generation circuit 19 for generating a TDMA timing signal 20 in accordance with TDMA timing control data and the time count data, a reception timing signal generation circuit 17 for generating the reception timing signal 11 in accordance with intermittent reception timing control data and the time count data 21, and a timer 18 for generating a timing signal in accordance with timer control data and the time count data, a memory 8 for storing the frequency control data and data of the predetermined frequency, a microprocessor 7 supplied with the system clock 10 for generating the frequency control data to control the frequency and phase of the system clock 10 in accordance with the detected frequency and phase to establish a system clock synchronizing condition with the frequency reference signal, generating the TDMA timing control data in accordance with the detected correlation to establish a TDMA synchronizing condition with the TDMA synchronizing signal, detecting data of an intermittent operation interval in the broadcast signal and generating the intermittent reception timing control data, storing the frequency control data, stopping supplying the supply power to the d/a converter and the radio wave communication circuit 2 using the supply power control circuit 9, setting and starting the timer 18 to generate the timing signal at a timing a predetermined period before the detected intermittent operation interval expires, and in response to the timing signal, supplying the supply power to the d/a converter and reading the frequency data from the memory and supplying the read frequency control data to the d/a converter, calculating the timing control data from the intermittent operation interval data and data of the predetermined self-oscillation frequency to compensate the timing control data to establish the TDMA synchronizing condition again Just before the detected intermittent operation interval expires to receive the reception control signal and the communication signal.

The radio wave receiving circuit 2 receives the TDMA radio wave signal. The received radio wave signal includes the frequency reference signal in a frequency compensation control channel, the TDMA synchronizing signal in a synchronizing control channel, the broadcast signal in a broadcasting control channel, the reception control signal in a reception control channel, and a communication signal in response to an intermittent receiving timing signal and the TDMA timing signal 20. Each channel is transmitted in a time division format. The equalizing circuit 3 equalizes the received TDMA radio wave signal from the radio wave communication circuit 2 and outputs the reception signal. The frequency detection circuit 13 detects the frequency and the phase of the frequency reference signal in the reception signal. The frequency reference signal is transmitted every eleven or twelve frames in the reception signal. The correlation detection circuit 14 detects the correlation between the TDMA synchronizing signal periodically transmitted in the reception signal and a predetermined data pattern representing TDMA timing to detect a phase difference between the TDMA synchronizing signal in the reception signal and the predetermined data pattern representing TDMA timing of this intermittent receiver. The supply power control circuit 9 controls supplying powers to the radio wave communication circuit 2 and the d/a converter 5. The voltage controlled crystal oscillator 4 oscillates to generate the system clock at the predetermined self-oscillation frequency when the power is not supplied to the d/a converter. When the power is supplied to the d/a converter 5, the voltage controlled crystal oscillator 4 generates the system clock 10 of which frequency and phase are controlled in accordance with frequency control data 16.

In the timing signal generation circuit 6, the counter 16 counts the system clock 10 and outputs the time count data 21. The TDMA timing signal generation circuit 19 generates the TDMA timing signal 20 in accordance with TDMA timing control data and the time count data. The reception timing signal generation circuit 17 generates the reception timing signal 11 in accordance with intermittent reception timing control data and the time count data 21. The timer 18 generates the timing signal in accordance with timer control data and the time count data.

The memory 8 stores the frequency control data and data of the predetermined frequency.

The microprocessor 7 generates the frequency control data to control the frequency and phase of the system clock 10 in accordance with the detected frequency and phase to establish the system clock synchronizing condition with the frequency reference signal, generates the TDMA timing control data in accordance with the detected correlation to establish the TDMA synchronizing condition with the TDMA synchronizing signal. Then, to enter the intermittent receiving mode, the microprocessor 7 detects data of intermittent operation interval in the broadcast signal in the broadcast channel and generates the intermittent reception timing control data, stores the frequency control data, stops supplying the supply power to the d/a converter and the radio wave communication circuit 2 using the supply power control circuit 9. Then, the microprocessor 7 sets and starts the timer 18 to generate the timing signal at a timing a predetermined period before the detected intermittent operation interval expires from the reception of the broadcast signal to receive the reception control channel. In response to the timing signal, the microprocessor 7 supplies the supply power to the d/a converter and reads the frequency data from the memory and supplies the read frequency control data to the d/a converter 5, calculates the timing control data from the data of the intermittent operation interval and data of the predetermined self-oscillation frequency to compensate the timing control data to establish the TDMA synchronizing condition again Just before the detected intermittent operation interval expires to receive the reception control signal and the communication signal.

When the microprocessor receives the reception control signal, the microprocessor 7 controls the equalizing circuit 2 to receive the communication signal in accordance with data in the reception control signal.

In this embodiment, this apparatus is described as a receiving apparatus. However, it is also possible to transmit data 31 inputted to the microprocessor through the radio wave communication circuit 2 and the antenna 1 in the transmission interval of the TDMA operation.

Figure 2:
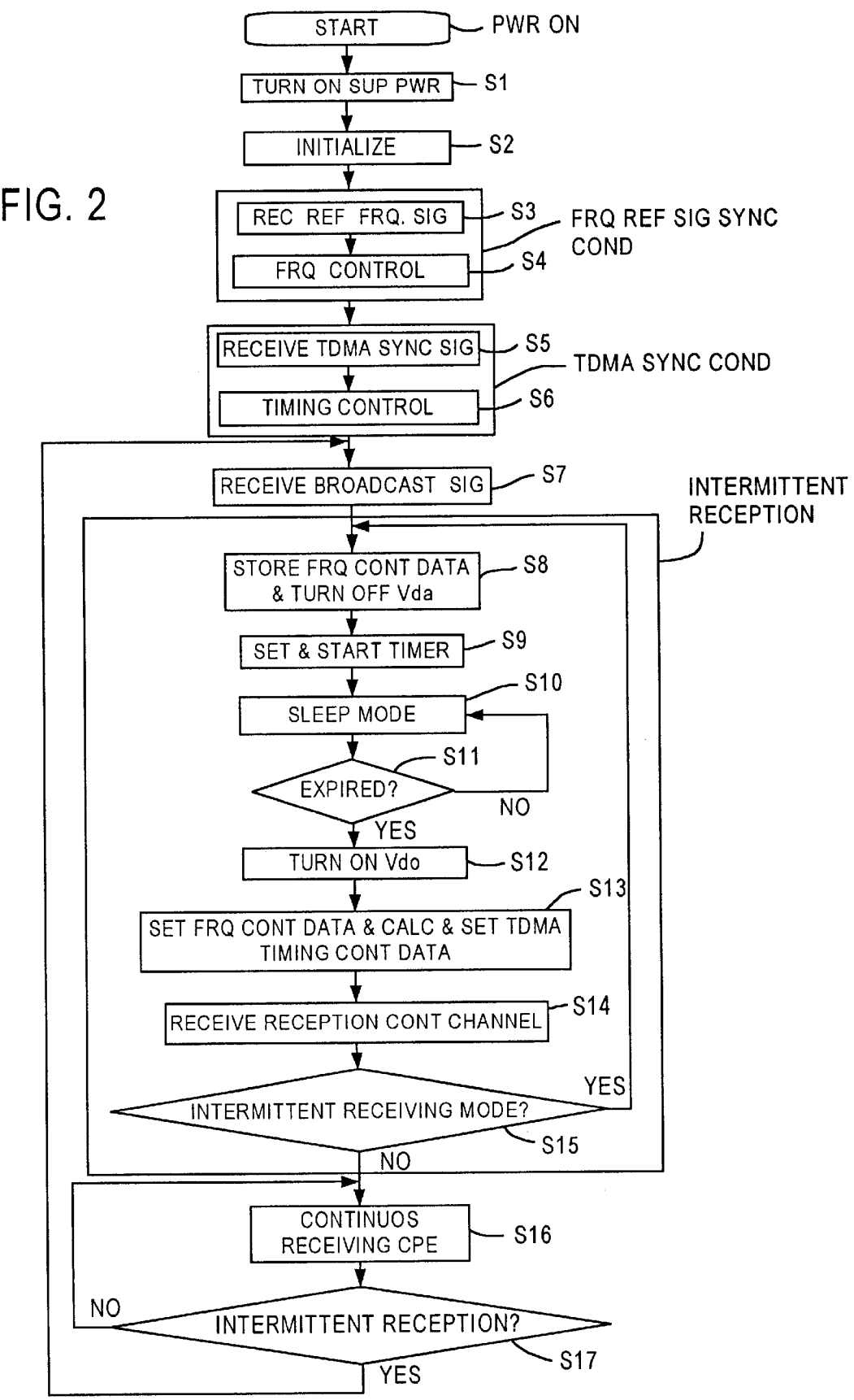
FIG. 2 depicts a flow chart of the first embodiment showing an operation of a microprocessor shown in FIG. 1.

FIG. 2 depicts a flow chart of the first embodiment showing the operation of the microprocessor 7.

In step s1, the microprocessor 7 turns on the supply powers Vda and Vrw using the supply power control circuit 9. The microprocessor 7 initializes respect portions of the receiving apparatus in step s2. The microprocessor 7 receives the detected frequency of the reference frequency signal indicating the frequency reference signal of the base station from the frequency detection circuit 13 in step s3.

The microprocessor 7 supplies the frequency control data to the d/a converter 5 to control the voltage controlled crystal oscillator 4 to synchronize the system clock 10 from the voltage controlled crystal oscillator 4 with the received frequency reference signal in step s4.

The microprocessor 7 receives phase difference from the TDMA phase detector 14 in step s5 and generates the TDMA timing control data in accordance with the detected correlation to establish the TDMA synchronizing condition with the TDMA synchronizing signal and resets the counter 16 and supplies the TDMA timing control data to the TDMA timing signal generation circuit 19 to establish the TDMA synchronizing condition in step s6.

In the following step s7, the microprocessor 7 receives the broadcast control channel from the reception signal from the equalizer 3 to receive data of the next intermittent receiving timing and determines the sleeping interval and the intermittent receiving timing following the sleeping interval from the data of the next intermittent receiving timing in step s7.

To enter the sleep condition the microprocessor 7 stores the frequency control data in the memory 8 and stops supplying the supply powers Vda and Vrw to the d/a converter 5 and the radio wave communication circuit 2 in step s8. Then, the microprocessor 7 sets and starts the timer 18 to generate the timing signal which should be generated at the end of the sleep interval in step s9. Moreover, the microprocessor 7 sets and starts the reception timing signal generation circuit 17 to generate the intermittent receiving timing signal 11 in step s9. In step s10, the intermittent receiving apparatus is in the sleep condition (mode), that is, the supply powers Vda and Vrw to the d/a converter 5 and the radio wave communication circuit 2 and the frequency of the system clock 10 moves to the self-oscillating frequency. The memory 8 also stores the data of the self-oscillating frequency in advance.

The microprocessor 7 checks the timing signal from the timer 18 repeatedly in step s11 and in response to the timing signal, that is, the sleeping interval has expired, the microprocessor 7 supplies the supply power to the d/a converter 5 and the radio wave communication circuit 2 to enter an arouse condition to prepare to receive the reception control channel to provide the intermittent receiving operation in step s12.

The microprocessor 7 calculates the TDMA timing control data to compensate the phase of the TDMA timing signal 20 from the sleep interval and the data of the self-oscillating frequency in step s13 because the phase of the TDMA timing signal 20 is shifted due to stopping the supply power Vda in the sleeping mode and supplies the TDMA timing control data to the TDMA timing signal generator 19 to compensate the TDMA timing signal. Then, in response to the intermittent receiving timing signal 11 and the TDMA timing signal 20 the microprocessor 7 receives the reception control signal in the reception control channel to communicate with the base station in step s14. In the. following step s15, if the mode is in the intermittent receiving mode, the processing returns to step s8. The timing control data is repeatedly used in step s9 or if the reception control signal received in step s14 includes a different intermittent interval, the timing control data is changed in accordance with the different intermittent interval. If the mode is not in the intermittent receiving mode in step s15, processing proceeds to a continuous receiving operation in step s16.

In step s17 following step s16, the mode is checked as to whether the mode enters the intermittent reception mode or the continues receiving mode. If the mode should enter the intermittent reception mode processing returns to step s7 and if the mode should enter the continuous reception mode processing returns to step s16.

In this embodiment, the TDMA timing signal 20 and the intermittent receiving timing signal 11 are independently supplied to the radio wave communication circuit 2. However, it is also possible to supply a timing signal representing the TDMA timing signal and the intermittent receiving timing signal. More specifically, the timing signal is derived by AND operation between the TDMA timing signal 20 and the intermittent receiving timing signal 11. That is, when the not in the intermittent operation the timing signal represents the TDMA timing and in the intermittent receiving operation, the timing signal represents the intermittent receiving timing.

As mentioned, the power consumption in the intermittent receiving operation can be provided by not supplying the supply power Vda in the sleeping condition.

SECOND EMBODIMENT

Figure 3:
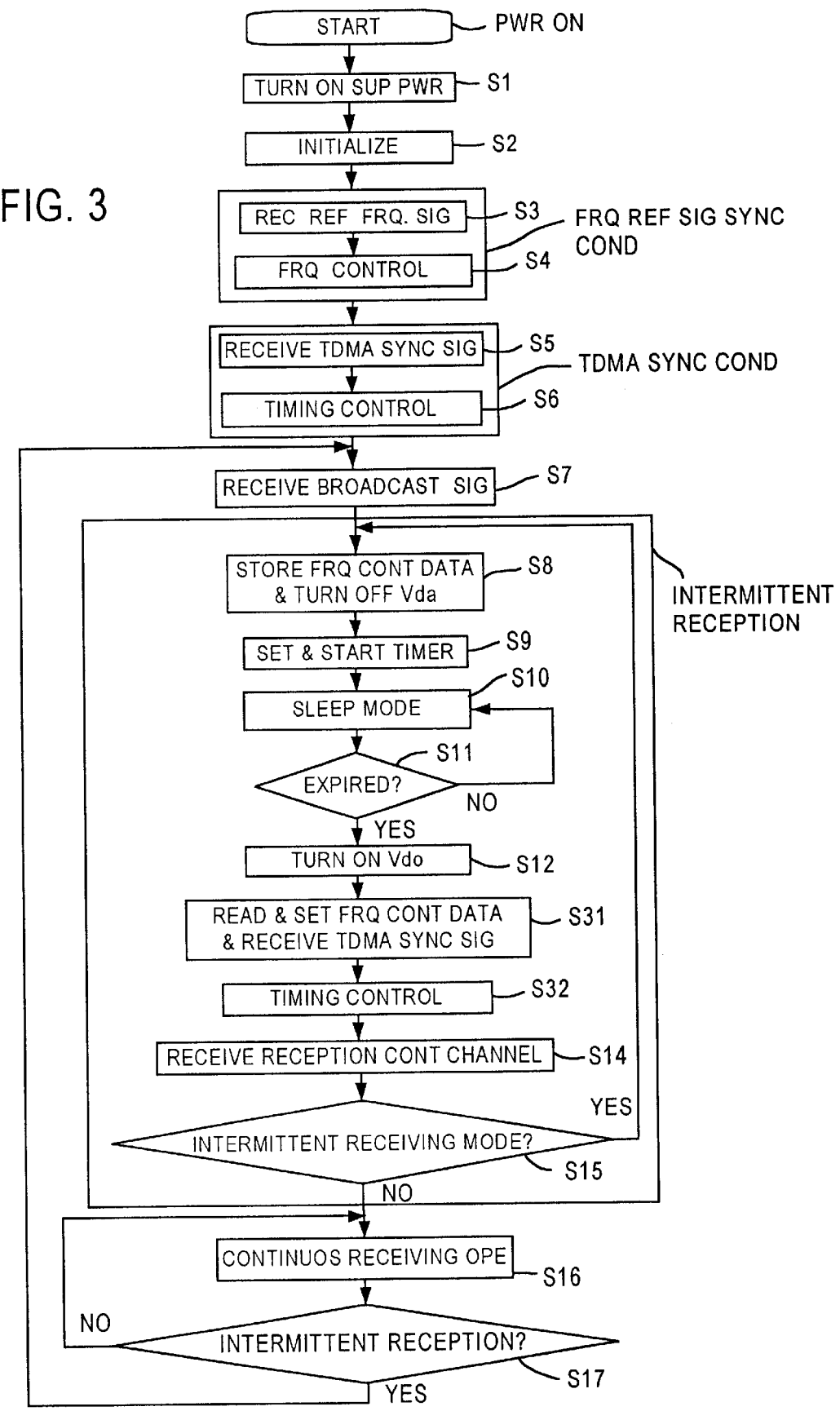
FIG. 3 depicts a flow chart of a receiving apparatus of a second embodiment showing its operation.

FIG. 3 depicts a flow chart of a receiving apparatus with intermittent receiving of a second embodiment showing its operation. The receiving apparatus of the second embodiment has the substantially the same structure and the same operation as the intermittent receiving apparatus of the first embodiment. The difference is in the operation of the microprocessor 7. That is, the difference is shown in FIG. 3 and there is no difference in the block diagram shown in FIG. 1. More specifically, the step s13 is replaced by steps s31 and s32 and the processing from step s1 to s12 and s14 to s17 are the same as those in FIG. 2.

After processing step s12, that is, after the supply powers to the d/a converter 5 and the radio wave communication circuit 2 are supplied, the microprocessor 7 reads the frequency control data from the memory 8 and supplies the frequency control data to the d/a converter 5 and receives the TDMA synchronizing signal in the reception signal in step s31. Then, the microprocessor 7 receives phase difference from the TDMA phase detector 14 and generates the TDMA timing control data in accordance with the detected correlation to establish the TDMA synchronizing condition with the TDMA synchronizing signal and resets the counter 16 and supplies the TDMA timing control data to the TDMA timing signal generation circuit 19 to establish the TDMA synchronizing condition again in step s32.

In the second embodiment, the intermittent interval is relatively short, it is possible to not compensates the TDMA timing control data because the phase difference is within the range of detecting correlation.

THIRD EMBODIMENT

FIG. 4 depicts a flow chart of a receiving apparatus of a third embodiment showing its operation. The receiving apparatus of the third embodiment has the substantially the same structure and the same operation as the intermittent receiving apparatus of the first embodiment. The difference is in the operation of the microprocessor 7. That is, the difference is shown in FIG. 4 and there is no difference in the circuit structure in FIG. 1. More specifically, the step s13 is replaced by steps s51 and s53 and the processing from step s1 to s12 and s14 to s17 are the same as those in FIG. 2.

After processing step s12, that is, after the supply powers to the d/a converter 5 and the radio wave communication circuit 2 are supplied, the microprocessor 7 receives the detected frequency of the reference frequency signal indicating the frequency reference signal of the base station from the frequency detection circuit 13 and the microprocessor 7 supplies the frequency control data to the d/a converter 5 to control the voltage controlled crystal oscillator 4 to synchronize the system clock 10 from the voltage controlled crystal oscillator 4 with the received frequency reference signal in step s51.

Then, the microprocessor 7 receives phase difference from the TDMA phase detector 14 in step s53 and generates the TDMA timing control data in accordance with the detected correlation to establish the TDMA synchronizing condition with the TDMA synchronizing signal and resets the counter 16 and supplies the TDMA timing control data to the TDMA timing signal generation circuit 19 to establish the TDMA synchronizing condition.

What is claimed is:

1. A receiving apparatus with intermittent receiving comprising:

receiving means responsive to a system clock signal for receiving a TDMA radio wave signal including frequency reference signal, a TDMA synchronizing signal, a broadcast signal, a reception control signal, and a communication signal;

equalizing means responsive to said system clock signal for equalizing said TDMA radio wave signal and outputting an equalized signal;

frequency detection means for detecting a frequency and a phase of said frequency reference signal in said equalized signal;

correlation detection means for detecting a correlation between said TDMA synchronizing signal in said equalized signal and a predetermined data pattern representing TDMA timing;

clock generation means including supply power control means, a d/a converter supplied with a supply power through said power supply control means and a voltage controlled oscillator for generating said system clock signal of which frequency and phase are controlled in accordance with frequency control data when said d/a converter supplied with said supply power and generating said system clock signal at a predetermined self-oscillation frequency when said d/a converter is not supplied with said supply power;

TDMA timing signal generation means for generating a TDMA timing signal in accordance with timing control data;

timer means for generating a timing signal;

a microprocessor supplied with said system clock signal, including a memory for storing said frequency control data and data of said predetermined frequency, in a continuous receiving receiving mode, said microprocessor generating said frequency control data to control said frequency and phase of said system clock signal in accordance with the detected frequency and phase to establish a system clock synchronizing condition with said frequency reference signal, generating said timing control data in accordance with the detected correlation to establish a TDMA synchronizing condition with said TDMA synchronizing signal, in an intermittent reception mode, said microprocessor detecting data of an intermittent operation interval in said broadcast signal, storing said frequency control data, stopping supplying said supply power to said d/a converter using said supply power control means, setting and starting said timer means to generate said timing signal at a timing a predetermined period before said intermittent operation interval expires, and in response to said timing signal, said microprocessor supplying said supply power to said d/a converter using said power supply control means, reading said frequency data from said memory, supplying said read frequency control data to said d/a converter, calculating said timing control data from said intermittent operation interval data and data of said predetermined self-oscillation frequency to compensate said timing control data to establish said TDMA synchronizing condition again just before said intermittent operation interval expires to receive said reception control signal and said communication signal.

2. The receiving apparatus as claimed in claim 1, wherein said microprocessor controls said equalizing means to receive said communication signal in accordance with data in said reception control signal.

3. A receiving apparatus with intermittent receiving comprising:

receiving means responsive to a system clock signal for receiving a TDMA radio wave signal including frequency reference signal, a TDMA synchronizing signal, and a broadcast signal, reception control signal, and a communication signal;

equalizing means responsive to said system clock signal for equalizing said TDMA radio wave signal and outputting an equalized signal;

frequency detection means for detecting a frequency and a phase of said frequency reference signal in said equalized signal;

correlation detection means for detecting a correlation between said TDMA synchronizing signal in said equalized signal and a predetermined data pattern representing TDMA timing;

clock generation means including supply power control means, a d/a converter supplied with a supply power through said power supply control means and a voltage controlled oscillator for generating said system clock of which frequency and phase are controlled in accordance with frequency control data when said d/a converter supplied with said supply power and generating said system clock at a predetermined self-oscillation frequency when said d/a converter is not supplied with said supply power;

TDMA timing signal generation means for generating a TDMA timing signal in accordance with timing control data;

timer means for generating a timing signal at a timing in accordance with timer control signal;

a microprocessor supplied with said system clock, including a memory for storing said frequency control data and data of said predetermined frequency, in a continuous reception mode, said microprocessor generating said frequency control data to control said frequency and phase of said system clock in accordance with the detected frequency and phase to establish a system clock synchronizing condition with said frequency reference signal, generating said timing control data in accordance with the detected correlation to establish a TDMA synchronizing condition with said TDMA synchronizing signal, in an intermittent reception mode, said microprocessor detecting data of intermittent operation interval in said broadcast signal, storing said frequency control data, stopping supplying said supply power to said d/a converter using said supply power control means, setting and starting said timer means to generate said timing signal at a timing a predetermined period before the detected intermittent operation interval expires, and in response to said timing signal, supplying said supply power to said d/a converter and reading said frequency data from said memory and supplying said read frequency control data to said d/a converter, detecting said correlation using said correlation detection means to compensate said timing control data to establish said TDMA synchronizing condition again Just before the detected intermittent operation interval expires to receive said reception control signal and said communication signal.

4. A receiving apparatus with intermittent receiving comprising:

receiving means responsive to a system clock signal for receiving a TDMA radio wave signal including frequency reference signal, a TDMA synchronizing signal, and a broadcast signal, reception control signal, and a communication signal;

equalizing means responsive to said system clock signal for equalizing said TDMA radio wave signal and outputting an equalized signal;

frequency detection means for detecting a frequency and a phase of said frequency reference signal in said equalized signal;

correlation detection means for detecting a correlation between said TDMA synchronizing signal in said equalized signal and a predetermined data pattern representing TDMA timing;

clock generation means including supply power control means, a d/a converter supplied with a supply power through said power supply control means and a voltage controlled oscillator for generating said system clock of which frequency and phase are controlled in accordance with frequency control data when said d/a converter supplied with said supply power and generating said system clock at a predetermined self-oscillation frequency when said d/a converter is not supplied with said supply power;

TDMA timing signal generation means for generating a TDMA timing signal in accordance with timing control data;

timer means for generating a timing signal at a timing in accordance with timer control signal;

a microprocessor supplied with said system clock, including a memory for storing said frequency control data and data of said predetermined frequency, in a continuous reception mode, said microprocessor generating said frequency control data to control said frequency and phase of said system clock in accordance with the first detected frequency and phase to establish a system clock synchronizing condition with said frequency reference signal, generating said timing control data in accordance with the detected correlation to establish a TDMA synchronizing condition with said TDMA synchronizing signal, in an intermittent reception mode, said microprocessor detecting data of an intermittent operation interval in said broadcast signal, storing said frequency control data, stopping supplying said supply power to said d/a converter using said supply power control means, setting and starting said timer means to generate said timing signal at a timing a predetermined period before the detected intermittent operation interval expires, and in response to said timing signal, said microprocessor supplying said supply power to said d/a converter, reading said frequency data from said memory, supplying said read frequency control data to said d/a converter, operating said frequency detection means to detect a second detected frequency of said frequency reference signal, generating said frequency control data in accordance with said second detected frequency, calculating said timing control data from said data of intermittent operation interval and data of said predetermined self-oscillation frequency to compensate said timing control data to establish said TDMA synchronizing condition again just before the detected intermittent operation interval expires to receive said reception control signal and said communication signal.

\* \* \* \* \*